United States Patent
Obrador et al.

(10) Patent No.: US 7,755,646 B2
(45) Date of Patent: Jul. 13, 2010

(54) IMAGE MANAGEMENT THROUGH LEXICAL REPRESENTATIONS

(75) Inventors: Pere Obrador, Mountain View, CA (US); Peng Wu, San Jose, CA (US)

(73) Assignee: Hewlett-Packard Development Company, L.P., Houson, TX (US)

( * ) Notice: Subject to any disclaimer, the term of this patent is extended or adjusted under 35 U.S.C. 154(b) by 539 days.

(21) Appl. No.: 11/582,118

(22) Filed: Oct. 17, 2006

(65) Prior Publication Data

US 2008/0088642 A1    Apr. 17, 2008

(51) Int. Cl.
G09G 5/00    (2006.01)
G09G 5/36    (2006.01)
G09G 5/40    (2006.01)

(52) U.S. Cl. .................... 345/655; 345/646
(58) Field of Classification Search ........... 345/646, 345/655
See application file for complete search history.

(56) References Cited

U.S. PATENT DOCUMENTS

| | | | | |
|---|---|---|---|---|
| 4,307,376 A * | 12/1981 | Miller et al. | ............... | 382/134 |
| 5,465,324 A * | 11/1995 | Lee et al. | ............... | 345/642 |
| 5,930,783 A * | 7/1999 | Li et al. | ............... | 707/1 |
| 5,958,636 A * | 9/1999 | Tamura | ............... | 430/30 |
| 6,099,582 A * | 8/2000 | Haruki | ............... | 716/11 |
| 6,502,105 B1 * | 12/2002 | Yan et al. | ............... | 707/104.1 |
| 6,853,746 B2 * | 2/2005 | Shin et al. | ............... | 382/164 |
| 6,937,761 B2 * | 8/2005 | Thomas et al. | ............... | 382/173 |
| 7,030,855 B2 * | 4/2006 | Metcalf | ............... | 345/108 |
| 7,030,885 B2 | 4/2006 | Kim et al. | | |
| 7,043,094 B2 * | 5/2006 | Thomas et al. | ............... | 382/305 |
| 7,076,095 B2 * | 7/2006 | Kim et al. | ............... | 382/164 |
| 7,548,334 B2 * | 6/2009 | Lo et al. | ............... | 358/1.15 |
| 2002/0081024 A1 * | 6/2002 | Park et al. | ............... | 382/165 |
| 2002/0196965 A1 * | 12/2002 | Wallace et al. | ............... | 382/131 |
| 2003/0020730 A1 * | 1/2003 | Hodgson et al. | ............... | 345/619 |
| 2004/0168155 A1 * | 8/2004 | O'Farrell et al. | ............... | 717/129 |
| 2004/0233056 A1 * | 11/2004 | Pulfer | ............... | 340/568.2 |
| 2005/0052665 A1 * | 3/2005 | Moroney | ............... | 358/1.9 |
| 2005/0057576 A1 * | 3/2005 | Shen et al. | ............... | 345/619 |
| 2005/0160412 A1 * | 7/2005 | Thurner | ............... | 717/148 |
| 2005/0283070 A1 * | 12/2005 | Imielinska et al. | ............... | 600/425 |
| 2006/0095853 A1 * | 5/2006 | Amyot et al. | ............... | 715/744 |
| 2006/0112088 A1 * | 5/2006 | Kobayashi et al. | ............... | 707/3 |
| 2006/0251294 A1 * | 11/2006 | Soll et al. | ............... | 382/107 |
| 2008/0021502 A1 * | 1/2008 | Imielinska et al. | ............... | 607/1 |
| 2008/0030497 A1 * | 2/2008 | Hu et al. | ............... | 345/419 |
| 2008/0088642 A1 * | 4/2008 | Obrador et al. | ............... | 345/619 |
| 2009/0024921 A1 * | 1/2009 | Belenov et al. | ............... | 715/716 |

OTHER PUBLICATIONS

Essam a. El-Kwae, Mansur R. Kabuka, A robust framework for content-based retrieval by spatial similarity in image databases, vol. 17 Issue 2, Apr. 1999, ACM.*

* cited by examiner

*Primary Examiner*—Javid A Amini

(57) ABSTRACT

In a method for image management, image data for an image containing objects is accessed. Graphical representations of the objects are generated and the centroids and the sizes of the graphical representations are determined. The locations of the centroids are determined and the morphologies of the graphical representations based upon the locations of the centroids are determined. Human readable lexical representations of the locations of the centroids, the sizes, the colors and morphologies of the graphical representations are assigned and are stored in a database, which is searchable through human readable lexicon.

20 Claims, 5 Drawing Sheets

IMAGE MANAGEMENT THROUGH LEXICAL REPRESENTATIONS

BACKGROUND

The use of personal computers and other digital hardware to process and display digital images has grown in popularity due to the ever increasing digital image and video content available on the Internet. One result of this growth in popularity is the increased complexity in retrieving desired images due to the large numbers of available images. Conventionally, the desired images are often retrieved through the file names of the images.

The file names, however, often do not provide an adequate description of the image or video content to enable a user to determine what the image or video content contains. As such, the contents of the images and videos stored on conventional databases are oftentimes stored with tags, which provide brief descriptions of the contents. For instance, an image containing a blue car on a black road may include tags such as, "car", "blue", and "road". These tags are typically inputted into the database manually, which is both labor and time intensive.

Automated approaches to describing the images and videos have included, for instance, with respect to describing colors, systems based on color encodings which represent components of a color in terms of positions or coordinates in a multidimensional color space. In other words, colors have been mathematically represented using numerical data indicative of the position or coordinates in the color space. Although data regarding a color may specifically define a color with respect to the color space, these representations typically do not intuitively convey information regarding the color to humans.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are methods and systems for managing images. More particularly, in the methods and systems disclosed herein, various characteristics of a plurality of images may be represented through human readable lexicon. These representations include the relationships between various objects in the images, which may also be represented through human readable lexicon. Through use of the methods and systems disclosed herein, a database of the images that is searchable through textual terms defining various characteristics of the images may be created. In addition, desired images may be retrieved through a search of the database using textual search terms or through a comparison with an input image.

Generally speaking, in one example, a user may access and search the database for one or more images in manners that are similar to searches performed for textual documents. As such, the method and systems disclosed herein may afford users with a relatively more intuitive manner of searching for images.

Figure 1:
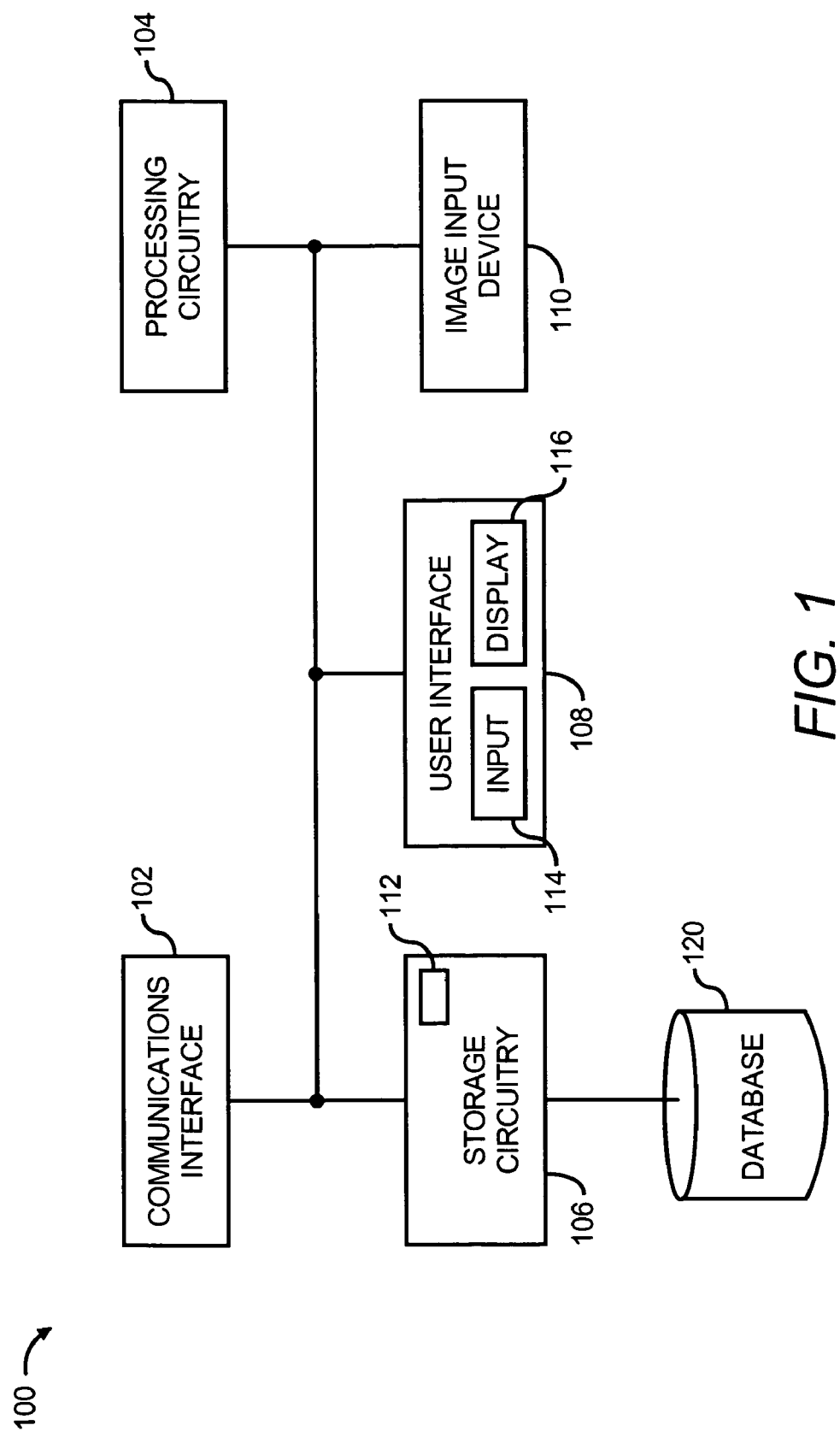
FIG. 1 shows a block diagram of an image management system, which may employ various examples of text-based image database creation and image retrieval processes disclosed herein, according to an embodiment of the invention.

With reference first to FIG. 1, there is shown a block diagram of an image management system 100 which may employ various examples of the text-based image database creation and image retrieval processes disclosed herein, according to an example. The image management system 100 is depicted as including a communications interface 102, processing circuitry 104, storage circuitry 106, a user interface 108, an image input device 110, and a database 120. The image management system 100 may include additional components and some of the components described herein may be removed and/or modified without departing from a scope of the image management system 100.

The communications interface 102 is arranged to implement communications of the image management system 100, which may be embodied in a computing device, with respect to external devices, which are not shown. For instance, the communications interface 102 may be arranged to communicate information bi-directionally with respect to another computing device. The communications interface 102 may be implemented as a network interface card (NIC), serial or parallel connection, USB port, Firewire interface, flash memory interface, floppy disk drive, or any other suitable arrangement for communicating with respect to the image management system 100.

In one example, the processing circuitry 104 is arranged to process data, control data access and storage, issue commands, and control other desired operations. The processing circuitry 104 may include circuitry configured to implement desired programming provided by appropriate media in at least one example, such as the methods disclosed herein below. For instance, the processing circuitry 104 may be implemented as one or more of a processor and other structure configured to execute executable instructions including, for example, software, firmware, and/or hardware circuitry instructions. The processing circuitry 104 may thus include, for instance, hardware logic, PGA, FPGA, ASIC, state machines, or other structures alone or in combination with a processor.

The storage circuitry 106 is configured to store programming such as executable code or instructions (for instance, software, firmware, or both), electronic data, image data, meta data associated with image data, databases, or other digital information and may include processor-usable media. Processor-usable media may be embodied in any computer program product(s) or article of manufacture(s) which may contain, store, or maintain programming, data and/or digital information for use by or in connection with an instruction execution system including the processing circuitry 104. The processor-usable media may include a computer readable storage medium. For instance, the processor-usable media may include any one of physical media such as electronic, magnetic, optical, electromagnetic, infrared or semiconductor media. Additional examples of processor-usable media include, for instance, a portable magnetic computer diskette, such as a floppy diskette, zip disk, hard drive, random access memory, read only memory, flash memory, cache memory, and other configurations capable of storing programming, data, or other digital information.

At least some of the examples or aspects described herein may be implemented using programming stored within appropriate storage circuitry 106 described above and/or communicated through a network or other transmission media and configured to control appropriate processing circuitry. For instance, programming may be provided through appropriate media including, for instance, embodied within articles of manufacture 112, embodied within a data signal, for instance, modulated carrier wave, data packets, digital representations, etc., communicated through an appropriate transmission medium, such as a communication network, for instance, the Internet, a private network, or both, wired electrical connection, optical connection, electromagnetic energy, for instance, through a communications interface, or provided using other appropriate communication structure or medium.

The storage circuitry 106 may further be in communication with the database 120, which may be created by the processing circuitry 104 to store images, morpho-lexical representations of the images, or both. As discussed in greater detail herein below, the database 120 may be created to generally enable search and retrieval of images through text-based search queries, similar to those used for text document search and retrieval.

The user interface 108 is configured to interact with a user including conveying data to a user by, for instance, displaying data for observation by the user, audibly communicating data to a user, etc., as well as receiving inputs from the user, for instance, tactile input, voice instruction, etc. As such, the user interface 108 may include a display 114, for instance, a cathode ray tube, LCD, etc., configured to depict visual information and a keyboard, mouse, and/or other suitable input device 116 for enabling user-interaction with the image management system 100.

In one example, a user may employ the user interface 108 to input search terms into the image management system 100, which may be similar to search terms used for text based searches.

The image input device 110 may be implemented as any suitable device configured to provide electronic image data corresponding to an image, such as a photograph, a frame of a video capture, etc., provided to the image management system 100. The image input device 110 may include, for instance, a scanning device, such as a flatbed color photograph scanner, a digital camera, a digital video camera, another image management system, etc.

The image input device 110 may additionally be implemented to input search criteria into the image management system 100. By way of example, an image may be scanned into the image management system 100 through the image input device 110 and the image may be morpho-lexically processed as discussed below. The characteristics of the morpho-lexically processed image may then be compared with the characteristics of the morpho-lexically processed images stored in the database 120 to, for instance, find images in the database 120 that are similar to the scanned image.

According to an example, the processing circuitry 104 may quantize the image data, which may include, for instance, RGB, Lab, etc., of a plurality of image forming elements, for instance, pixels, to identify areas of the images having a consistent or common characteristic. The consistent or common characteristic may include, for instance, contiguous areas in the images having the same colors. The quantized image data may be further morpho-lexically processed to thereby translate the image data into human readable lexicon, as described in greater detail herein below.

The terms "morpho-lexically process" may be defined to include processes in which one or more characteristics of the various areas in the images are identified and labeled using human readable lexicon. The one or more characteristics may include, for instance, the locations of the various areas with respect to each other, the colors of the various areas, the sizes of the various areas, etc. In addition, the one or more characteristics may include the relationships between the various areas with respect to each other and the borders of the images. In other words and as described in greater detail herein below, morphological processing may be performed upon images which have been lexically quantized.

The terms "lexical quantization" may be defined to include the use of human comprehensible words of a human readable lexicon, for instance, words of the English language or other language, to describe visual characteristics of the contents or objects in an image. The human comprehensible words may be associated with the image data and may be used to assist with or facilitate management of the images, such as, in the creation of the searchable database 120 of images. As disclosed herein, the human comprehensible words may also assist with or facilitate in the retrieval of images from the searchable database 120 of images.

The human comprehensible words may describe characteristics, for instance, colors, gray scaling, or both, of contents of the images in a natural language, which may readily be understood by average humans. The human comprehensible words may include, for instance, lexical color names present within a human readable and comprehensible lexicon, for instance, content readily read and understood by humans as part of a human language, as distinguished from machine language or code, which may also be understood by programmers but typically requires some type of mapping or understanding of mathematical relationships to color. Examples of lexical color names readily recognizable to humans include, black, red, blue, green, yellow, orange, etc.

The human comprehensible words may also include quantized lexical size designations present within a human readable and comprehensible lexicon. Examples of quantized lexical size designations readily recognizable to humans include, for instance, very small, small, medium, large, very large, etc. As should be clearly understood, the lexical size designations may include a plethora of other size designations depending upon the desired level of granularity in describing the sizes of the objects contained in the images relative to each other or otherwise relative to some other feature.

The human comprehensible words may further include lexical relative position labels present within a human readable and comprehensible lexicon. The lexical relative position labels may, for instance, denote the location of a first object with respect to the location of a second object, the location of the first or second object with respect to the image, the location of the first or second object with respect to one or more borders of the image, etc. In addition, or alternatively, the lexical relative position labels may denote whether the first object is in contact with the second or other object. In any regard, examples of lexical relative position labels that are readily recognizable to humans include, north, south, east, west, left, right, center, upper, lower, etc. As such, the lexical relative position labels may be as detailed or as broad as desired, depending upon, for instance, the desired level of granularity in describing the relative positions of the objects in an image.

According to an example, in terms of colors, the lexical color names corresponding to quantization bins may be generated by an aggregation of definitions of a relatively large population of humans. Accordingly, in some examples, words that describe ranges of frequencies of the electromagnetic visible spectrum and which are readily understood words of the human lexicon as distinguished from technical terms for identifying the electromagnetic energy and perhaps only familiar to technical persons educated with respect to such technical terms, are employed in at least one implementation. Words may refer to any meaning bearing sequences of symbols of a lexicon, and may include abbreviations and lemmas, as examples.

In one example directed to color, the number of categories or bins for lexical quantization is determined according to the number of color names used to characterize images. Once the images are lexically quantized, words indicative of the content of the images, for instance, lexical color names, are associated with image forming elements of the images. Additional details of lexical quantization are discussed in detail below.

The morphological processing described herein may be performed upon an image which has been lexically quantized as mentioned above. That is, an appropriate one of the lexical color names is associated with each of the image forming elements of the image corresponding to the color contents of the image forming elements. Generally speaking, the morphological processing identifies plural areas of the images having a consistent or common characteristic. In a more specific example, areas of an image are identified as one of the lexical color names, are associated with each of the areas, and correspond to the color of the respective area. Morphological processing may include filtering of image forming elements of a given area which do not have the common characteristic and to change the content of such elements to the common characteristic. The filtering may be provided in different resolutions as discussed below.

Information regarding the resultant areas may be associated with the initial image data, for instance, the image data of the images before lexical quantization and morphological processing and useable to reproduce faithful reproductions of the images, and stored for example, as metadata of the images using the storage circuitry 106. The metadata may be used to identify and retrieve desired initial image data of respective images in one example.

Information regarding the resultant areas, which may be referred to as area information, may include a lexical color name indicative of the color of the image forming elements of the area. The area information may additionally include mass information, for instance, the quantity of image forming elements of the areas in number of pixels or a percentage to the total, as well as location information of the area. The location information may identify a centroid of the respective region corresponding to the average x and y locations of all image forming elements of the area, in one example. In another example, the mass information may be represented by lexical mass designations and the location information may be represented by lexical relative position labels.

Figure 2:
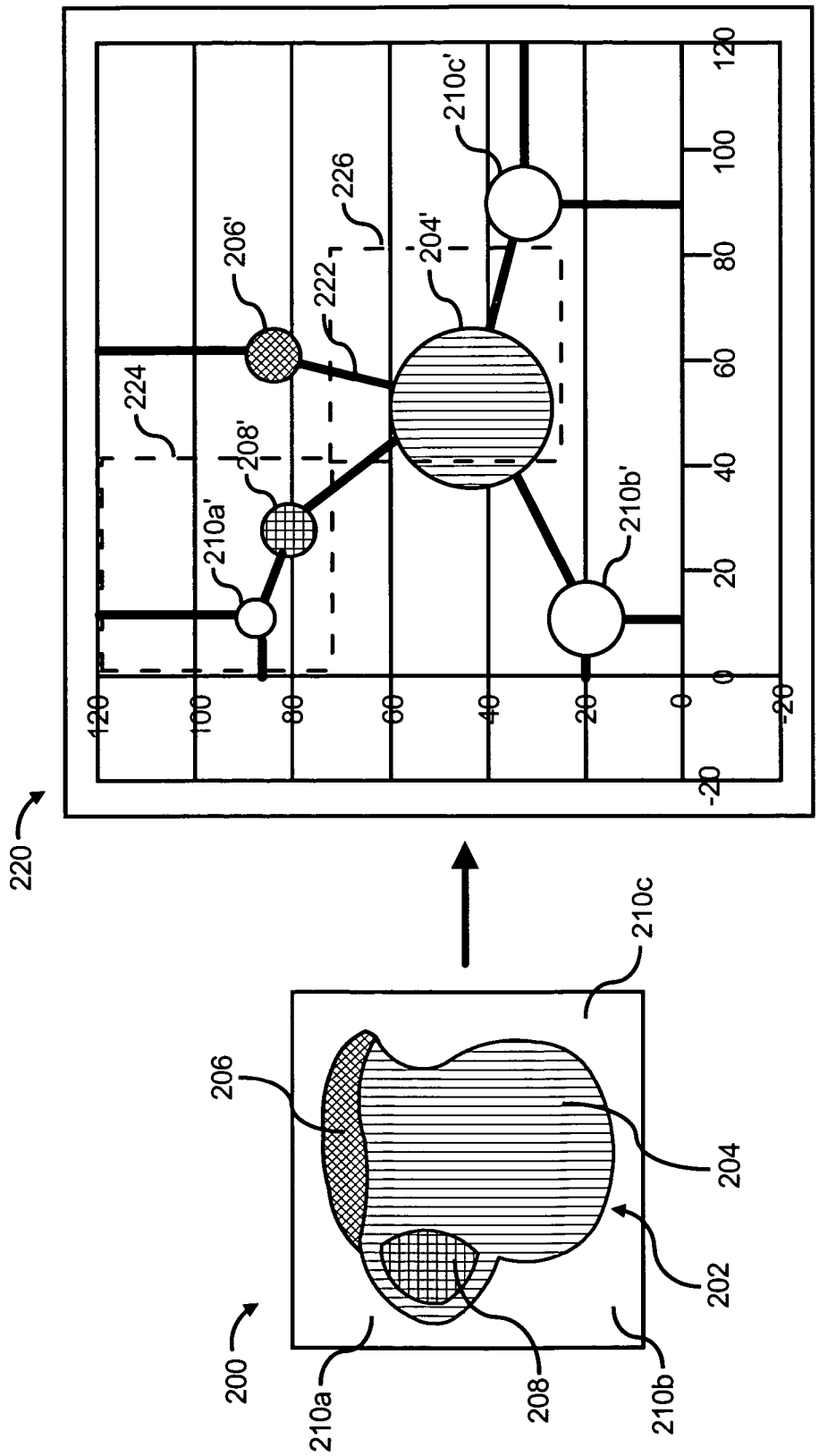
FIG. 2 shows a block diagram of an original image and a morhpo-lexical histogram derived from the original image, according to an embodiment of the invention.

A more detailed example of how lexical representations are derived and used to describe images is provided with respect to FIG. 2, which depicts an original image 200 and a morpho-lexical histogram 220 derived from the original image 200.

As shown in FIG. 2, the original image 200 may comprise a segmented image generated using a quantization method discussed in greater detail herein below. Other methods for segmenting images, for instance, generating multiple segments of an image and each of the segments being assigned a single color, may be used in other examples. In any case, the original image 200 includes a plurality of objects, including, a jug 202 having an exterior color 204 and an interior color 206. Within a handle portion of the jug 202 is a third color 208, which may be darker than the surrounding regions of the jug 202 due to shadows. In addition, various objects surrounding the jug 202 are labeled as 210a-210c.

Following processing of the image data of the original image 200, the morpho-lexical histogram 220 may be created. The morpho-lexical histogram 220 of FIG. 2 includes graphical representations of the various areas in the original image 200. More particularly, the morpho-lexical histogram 220 generally depicts graphical representations of the various objects according to their sizes, colors, respective locations, and morphologies. As such, the morpho-lexical histogram 220 graphically depicts the various sections 204-208 of the jug 202 and the areas 210a-210c surrounding the jug 202 according to their centroids, sizes, and colors. Thus, for instance, the exterior color 204 of the jug 202 is graphically represented as a relatively large circle 204' having the exterior color 204, the centroid of which is positioned near the center of the morpho-lexical histogram 220. In addition, the graphical representation 204' of the area having the exterior color 204 is depicted as being in contact with graphical representations 206' and 208' of the areas having the interior color 206 and the third color 208, respectively, through lines 222. The graphical representations 204'-208' are also depicted as being in contact with graphical representations 210a'-210c' of the areas 210a-210c surrounding the jug 202.

According to an example, the processing circuitry 104 may employ the morpho-lexical histogram 220 to derive lexical representations of the objects in the original image 200. By way of example, the processing circuitry 104 may determine the colors of the graphical representations 204'-210c' and may assign lexical color names to the graphical representations 204'-210c' as described above. In addition, the processing circuitry 104 may determine that the graphical representation 204' is very large, that the graphical representations 210b' and 210c' are medium, that the graphical representations 206' and 208' are small, and that the graphical representation 210a' is very small. In addition, the processing circuitry 104 may assign lexical size designations according to the determined sizes.

The processing circuitry 104 may further determine the relative positions of the graphical representations 204'-210c' with respect to each other, the boundaries of the image 200, or both. The processing circuitry 104 may also assign lexical relative position labels for the graphical representations 204'-210c'. For instance, the processing circuitry 104 may store an indication that the graphical representation 206' is located above the graphical representation 204' and the graphical representation 210c' is located to the right of the graphical representation 204'.

As another example, the processing circuitry 104 may divide the morpho-lexical histogram 220 into a plurality of virtual swaths. For instance, the morpho-lexical histogram 220 may be divided into 3 equal virtual swaths, which extend horizontally across the morpho-lexical histogram 220. In addition, each of the swaths may be divided into a number of regions. The number of swaths and regions into which the morpho-lexical histogram 220 is divided may be based, for instance, on the densities of the various regions. That is, for instance, the processing circuitry 104 may divide the morpho-lexical histogram 220 into a greater number of regions if there is a greater density of regions. As discussed in greater detail herein below, the regions may be identified as the swaths are traversed, to thereby enable lexical representations of the regions, and the graphical representations contained in the regions, to be generated.

Figure 3A:
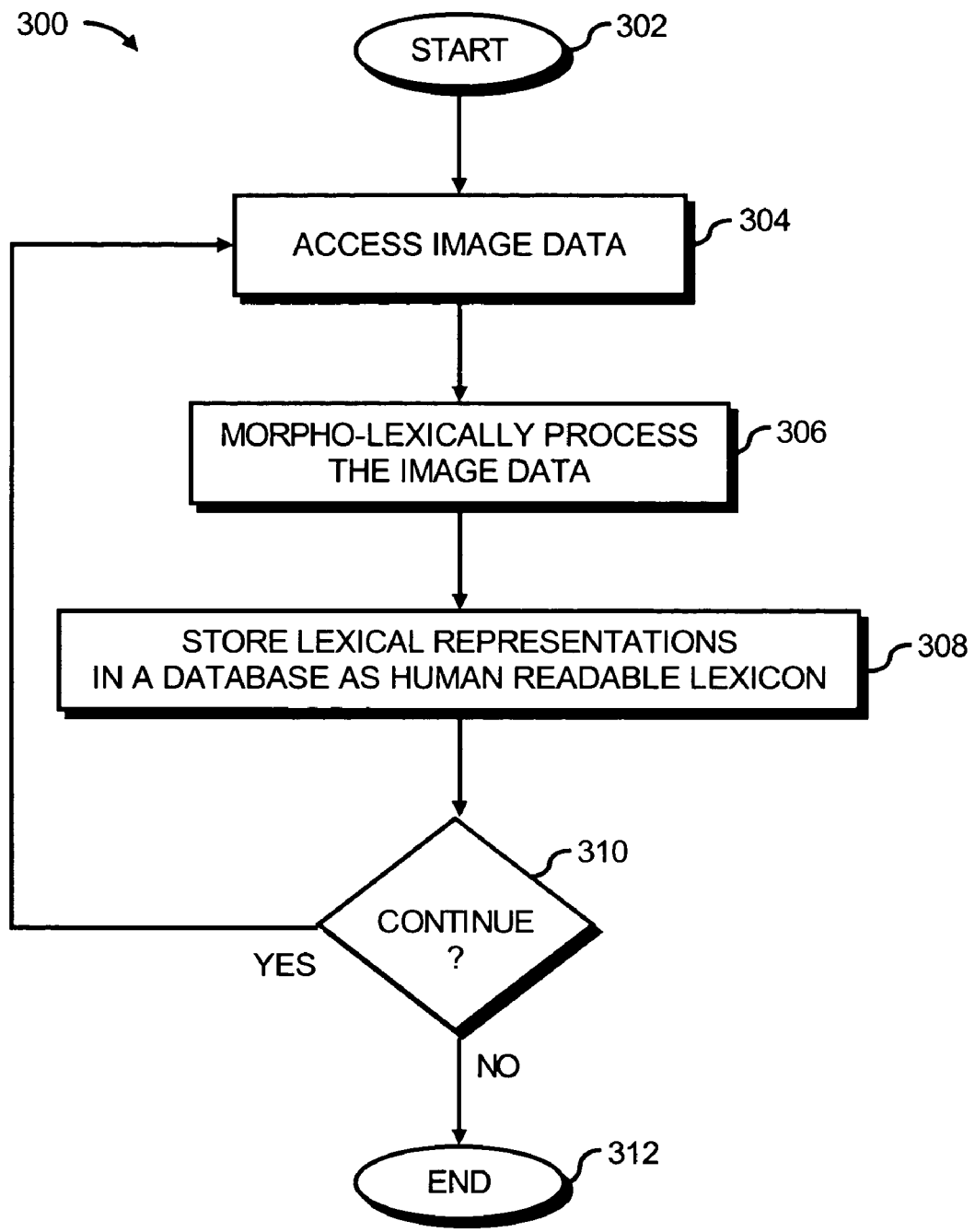
FIG. 3A shows a flow diagram of a method for creating a database of images, according to an embodiment of the invention.

With reference now to FIG. 3A, there is shown a flow diagram of a method 300 of creating a database of images, where the database is searchable through human readable lexicon, according to an example. The method 300 may be performed using the processing circuitry 104. However, other methods may include more, less and/or alternative steps in other examples.

At step 302, the processing circuitry 104 may initiate the method 300 through receipt of a command from a user, at a predetermined period of time, automatically, etc. Once initiated, the processing circuitry 104 may access image data of an image to be processed, at step 304. The image data may include RGB data for a plurality of image forming elements, for instance, pixels. Thus, for instance, the processing circuitry 104 may operate to convert the image data to a desired color space, such as Lab.

In any event, the processing circuitry 104 may morpho-lexically process the image data, as indicated at step 306. The image data may be morpho-lexically processed as described above with respect to FIG. 2 to yield human readable lexical representations of the various regions contained in the images. One manner in which the image data is morpho-lexically processed is discussed in greater detail herein below with respect to FIG. 3B.

The image data may be morphologically processed at step 306 through a series of morphological operations at multiple resolutions allowing spurious colors to be removed from homogeneous color regions in the image. At step 306, images may be filtered morphologically to represent the images as graphical representations individually comprising a single consistent color. In general, graphical representations are defined wherein a majority of the image forming elements have a consistent or common characteristic (common lexical color name resulting from the lexical quantization) and other inconsistent image forming elements of the graphical representations may be changed or filtered to the consistent characteristic. More detailed description of various manners in which the image data may be morphologically processed are described in U.S. patent application Ser. No. 11/495,846 entitled "Image Processing Methods, Image Management Systems, and Articles of Manufacture", filed on Jul. 27, 2006, and U.S. patent application Ser. No. 11/495,847 entitled "Image Management Methods, Image Management Systems, and Articles of Manufacture", filed on Jul. 27, 2006. The disclosures of both of the above-identified Applications are hereby incorporated by reference in their entireties.

The processing circuitry 104 may control the storage circuitry 106 to store the lexical representations in the database 120 as human readable lexicon, as indicated at step 308. The database 120 may be searchable through textual queries as described in greater detail herein below. In addition, the images may be stored on the database and the human readable lexical representations of the regions in the image may be stored in the metadata of the image.

At step 310, the processing circuitry 104 may determine whether the method 300 is to be continued. The processing circuitry 104 may determine that the method 300 is to be continued, for instance, in order to create and store lexical representations of any additional images. If, however, there are no additional images, the processing circuitry 104 may end the method 300 at step 312.

Figure 3B:
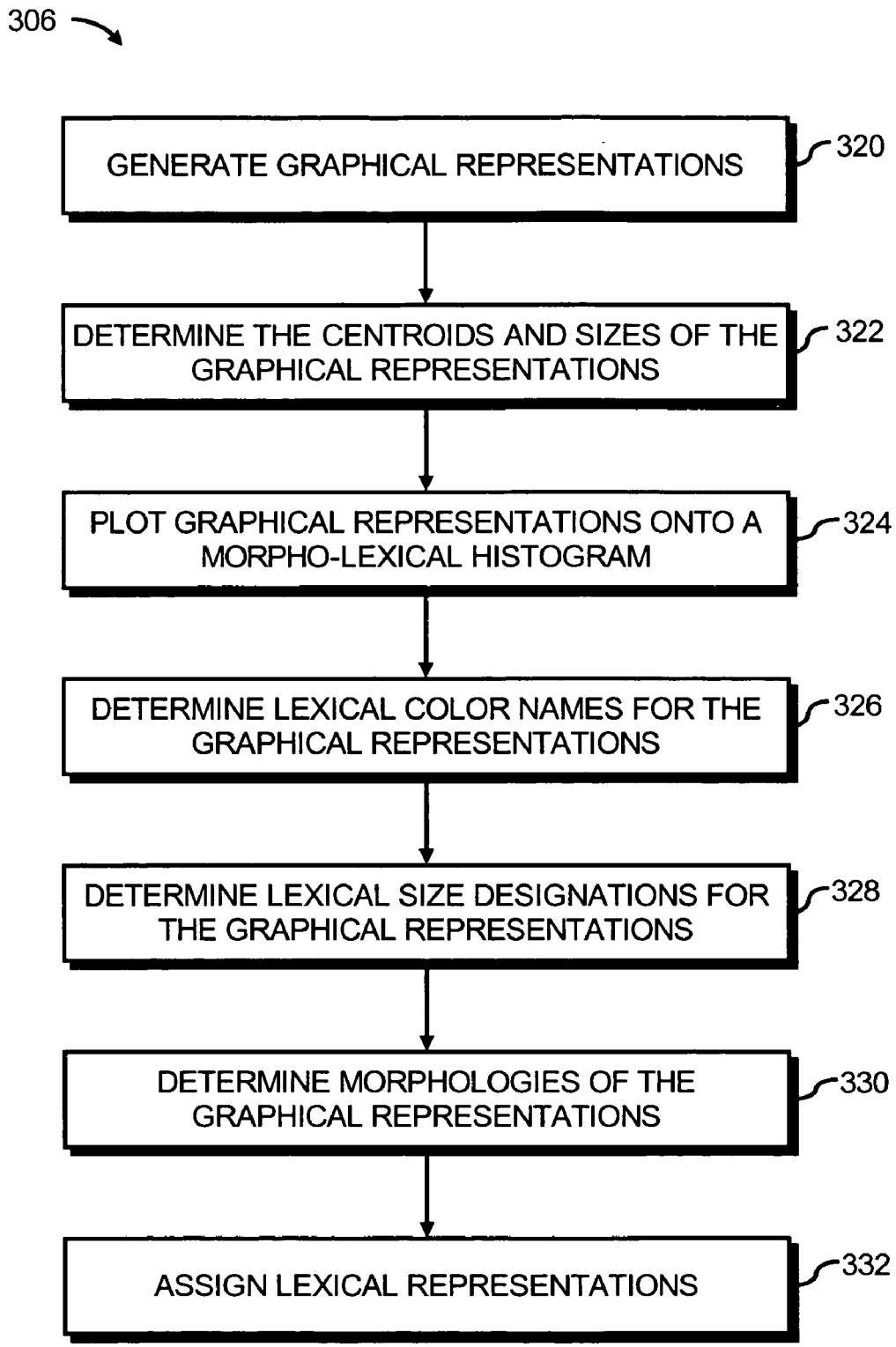
FIG. 3B shows a more detailed flow diagram of various steps performed with a morpho-lexical process step discussed in FIG. 3A, according to an embodiment of the invention.

With particular reference now to FIG. 3B, there is shown, in greater detail, various steps performed with respect to step 306 in FIG. 3A, according to an example. As such, FIG. 3B illustrates the steps of morpho-lexically processing an image, according to an example.

At step 320, the processing circuitry 104 may generate graphical representations of various objects or areas in the image, such as the image 200. More particularly, for instance, the processing circuitry 104 may associate individual image forming elements of a quantized image with one of a plurality of respective graphical representations. Quantization of the image allows for a discrete outcome permitting filtering of non-consistent colors within a graphical representation.

The objects may be defined into respective graphical representations through identification of which areas in the image contains consistent or common characteristics. The consistent or common characteristic may include, for instance, contiguous areas in the images having the same colors. In addition, some areas may be merged if a plurality of areas are identified as corresponding to a single portion or object of an original image, for instance, due to a color gradient occurring in the portion or object causing the lexical quantization of the portion or object to be classified into plural areas. In any case, with reference to FIG. 2, the respective graphical representations may include the exterior color 204, the interior color 206, the third color 208, and the areas 210a-210c surrounding the jug 202.

In one example, for an individual graphical representation, the processing circuitry 104 may analyze the respective subject graphical representation with respect to other graphical representations which touch or border the respective subject graphical representation, and if certain criteria are met, the processing circuitry 104 may merge appropriate graphical representations. Once the regions which border a subject graphical representation are identified, the processing circuitry 104 may access initial image data of the image, for instance, the content of the image data prior to lexical or morphological processing, corresponding to the subject graphical representations and the bordering graphical representations and may calculate respective average values, for instance, average luminance and chrominance L, a, and b values of an exemplary Lab color space, of the graphical representations using the initial image data. The average values of the subject graphical representation may be compared with each of the average values of the respective bordering graphical representations, for example using a Euclidean metric:

$$\text{EuclideanDistance} = \sqrt{(x_1-y_1)^2...(x_n-y_n)^2} \qquad \text{Eqn. 1}$$

where the x values correspond to average L, a, b values of the subject region and the y values correspond to average L, a, b values of the bordering region being analyzed.

If the results of Eqn. 1 comparing the subject graphical representation with a respective bordering graphical representation are below a threshold, then the two graphical representations may be merged with one another. In one example, the threshold may be selected to distinguish between merging of graphical representations which are so similar in the original image that they should be merged, for instance, select the threshold to identify plural similar graphical representations which were near a border between quantization bins, from not merging graphical representations which clearly include content of different colors, for instance, quantization into separate bins did not occur as a result of the color crossing into plural similar quantization bins. The analysis may be repeated for the other graphical representations which border the subject graphical representation in one embodiment. The merged graphical representations may represent a single object of the image using a single image graphical representation in one embodiment.

Once the regions are identified, and merged if appropriate, the graphical representation information including lexical color name, mass and location of each of the graphical representations may be associated with the respective image, for example, as meta data. Various manners in which lexical representations of the graphical representation information are determined and assigned are discussed in greater detail herein below.

At step 322, the processing circuitry 104 may determine the centroids and the sizes of the various graphical representations. The processing circuitry 104 may determine these characteristics of the graphical representations based upon the arrangement of the image forming elements or objects in the image. In any event, at step 324 the processing circuitry 104 may plot the graphical representations onto a morpho-lexical histogram, for instance, in a manner similar to the morpho-lexical histogram 220 depicted in FIG. 2.

At step 326, the processing circuitry 104 may determine lexical color names of the various graphical representations. As described above, the processing circuitry 104 may determine human comprehensible words to describe the lexical color names of the various regions in the image, such as, black, red, blue, green, yellow, orange, etc.

At step 328, the processing circuitry 104 may determine lexical size designations for the various graphical representations. The lexical size designations may include, for instance, very small, small, medium, large, very large, etc. In one example, the processing circuitry 104 may compare the sizes of the graphical representations with respect to each other to determine the lexical size designations. In another example, the processing circuitry 104 may compare the sizes of the graphical representations with preset standards to determine the lexical size designations. In this example, for instance, the processing circuitry may determine that a graphical representation is small if that graphical representation is below a predetermined percentage of the overall image.

At step 330, the processing circuitry 104 may morphologically process the quantized image to determine the relationships between the various graphical representations. More particularly, for instance, the processing circuitry 104 may determine the positions of the graphical representations with respect to each other and their respective positions on the image itself. The morphological processing of step 330 may include one or more levels of morphological processing (filtering) at different resolutions. Additional details of processing of plural stages in one example are discussed in Obrador, Pere, "Multiresolution Color Patch Extraction," published in SPIE Visual Communications and Image Processing, Jan. 15-19, 2006, San Jose, Calif., the teachings of which are incorporated herein by reference in its entirety.

In addition, the processing circuitry 104 may use a plurality of morphological filters to generate abstract representations of the image at multiple resolution levels. The morphological filters may be used to vary the amount of detail to be kept in the abstract representations of the image. For instance, in lower resolution levels, the smaller graphical representations are obviated, thereby leaving a very coarse abstract representation and lexical representation of the image. In contrast, at higher resolution levels, a greater level of detail is retained and relatively smaller graphical representations are represented in the abstract representation and a more detailed lexical representation of the image is provided.

In any event, the processing circuitry 104 may determine which of the graphical representations is in contact with which of the other graphical representations, which of the graphical representations are in contact with the borders of the image, etc. In addition, or alternatively, the processing circuitry 104 may divide the image or the morpho-lexical histogram representation of the image into a plurality of virtual swaths, with each swath containing zero or more virtual regions. In this instance, the processing circuitry 104 may, for example, scan across the virtual swaths to determine the relative positions of the virtual regions with respect to each other. For instance, the processing circuitry 104 may identify that a region A, located in a center of the image, has a neighbor region B, which is located to the North of region A, and a neighbor region C, which is located to the East of region A.

At step 332, the processing circuitry 104 may assign human readable lexical representations to the virtual regions. Thus, for instance, with reference to FIG. 2, the processing circuitry 104 may determine that a first region, denoted by dashed lines 224 and taken from the top left corner of the histogram 220, includes the graphical representations 210a' and 208'. Assuming, for instance, that the graphical representation 210a' is light gray and that the graphical representation 208' is dark gray, the processing circuitry 104 may assign the first region 224 with human readable lexical representations that indicate a very small light gray graphical representation is located to the left of a small dark gray graphical representation. In addition, assuming that the graphical representation 204' is orange, the processing circuitry 104 may assign a centrally located region 226 with human readable lexical representations that indicate a very large orange graphical representation. In other words, the processing circuitry 104 may determine that the first region 224 is to the NorthWest of the central region 226. In addition, the processing circuitry 104 may determine that a very large orange graphical representation is located beneath and to the right of a small dark gray color patch, which is located to the right of a very small light gray patch, and so forth.

The processing circuitry 104 may repeat this process with the remaining regions to thereby identify and assign human readable lexical representations of the remaining graphical representations. In addition, the human readable lexical representations may be stored in the text-based searchable database as indicated at step 308.

Figure 4:
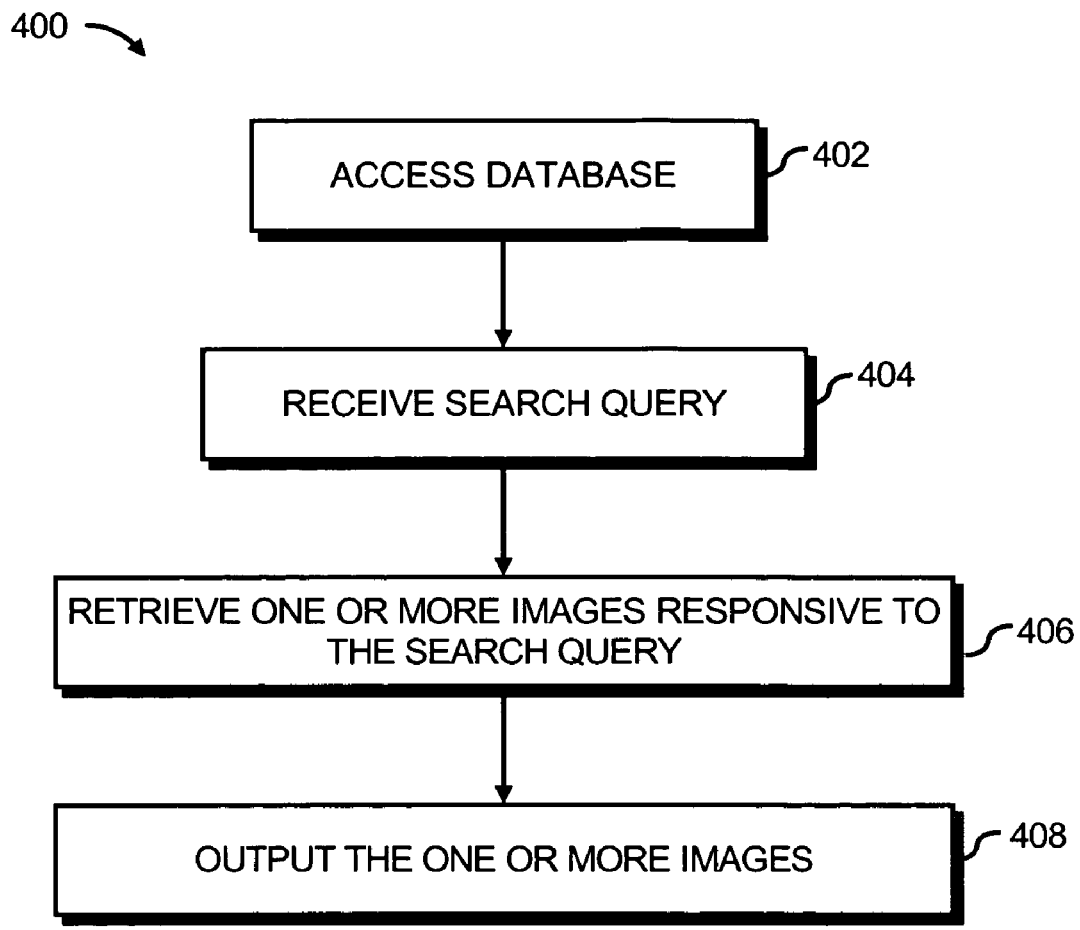
FIG. 4 shows a flow diagram of a method for searching for images on a database created through implementation of the method depicted in FIG. 3A, according to an embodiment of the invention.

Turning now to FIG. 4, there is shown a flow diagram of a method 400 for retrieving images on the database 120 created through implementation of the method 300. The method 400 generally depicts a manner in which the database 120 may be queried such that one or more desired images may be retrieved. More particularly, the method 400 enables text-based queries, similar to those used to retrieve text documents, to be employed in finding and retrieving image documents.

At step 402, the database 120 may be accessed by the processing circuitry 104. In addition, at step 404, the processing circuitry 104 may receive a search query. In one example, the search query may be received through the user interface 108 as one or more search terms. In this example, the processing circuitry 104 may parse the one or more search terms to determine various characteristics of the one or more search terms. For instance, if the search query includes the term "beach", the processing circuitry 104 may determine that images that may match the desired term include, on a high level, a very large blue area above a very large beige area. On a more detailed level, the processing circuitry 104 may determine that images containing a blue sky and beige sand are matching characteristics for the term "beach". In either case, the processing circuitry 104 may determine the relative positions of the different regions concerning the search query term(s).

In addition or alternatively to the lexical color names, the processing circuitry 104 may receive a request for desired images via input 108 using search criteria including characteristics, such as lexical color names, mass and/or location information of one or more regions within the desired images to be retrieved. The request may specify one or more regions of images to be retrieved, for instance, "Locate images having a large blue region center top, a medium red region center, and a yellow region center bottom", and processing circuitry 104 may search images stored in storage circuitry 106 using the search criteria and region information associated with the stored images, as indicated at step 406, and rank the stored images according to how close they match the search criteria.

In performing the search, the processing circuitry 104 may create a search representation using the inputted text search request which represents the specified lexical color name, mass and/or location information which may be used to search the stored images. The search representation may, for instance, be in the form of three vectors corresponding to color, mass and location.

In another example, the search query may be received through the image input device 110 as, for instance, a scanned image. In this example, the processing circuitry 104 may morpho-lexically process the scanned image as described above with respect to FIGS. 3A and 3B to obtain lexical representations of the scanned image. Thus, for instance, if the scanned image includes a beach picture, the processing circuitry 104 may determine that the scanned image contains a very large blue area above a very large beige area.

In this example, the processing circuitry 104 may rank the images stored in the database 120 according to respective similarities to the scanned images. The processing circuitry 104 may create region information of at least one region of the search image to create a search representation and use the search representation to search the stored images using the region information associated with respective ones of the stored images. More particularly, for instance, the processing circuitry 104 may access the database 120 to retrieve one or more images that are responsive to the search query, at step 406. Thus, with respect to the beach example discussed above, the processing circuitry 104 may retrieve all of the images that have a very large blue area above a very large beige area.

In either example above, the processing circuitry 104 may access region information of the stored images and compare the search criteria with respect to the region information of the regions of the stored images in an attempt to identify desired images. The processing circuitry 104 may use the lexical color name, mass and location information to perform comparison operations. For example, the lexical color name, mass and location information may be used to calculate distances of at least one region of the search criteria with respect to a region of each of the stored images. The processing circuitry 104 may be configured to rank the similarity of the search criteria with respect to each of the stored images as a relationship directly proportional to size of the graphical representations, inversely proportional to centroids of the graphical representations, and inversely proportional to the color differences of the graphical representations. For example, for calculating a distance between two images 1 and 2, the following formulae may be used:

$$Dist_{colorPatch_i \to colorPatch_j} = \text{Eqn. 2}$$

$$proportionalTo\left(\frac{centroidDist_{ij} * colorDist_{ij}}{patchSize_i * patchSize_j}\right)$$

with $$centroidDist_{ij} = \sqrt{\begin{array}{l}(centroidX_i - centroidX_j)^2 + \\ (centroidY_i - centroidY_j)^2\end{array}}$$

and $$colorDist_{ij} =$$

$$\sqrt{\begin{array}{l}(averageL_i - averageL_j)^2 + (averageA_i - averageA_j)^2 + \\ (averageB_i - averageB_j)^2\end{array}}$$

$$overallDist_{image1 \to image2} = \sum_{i \in image1} \sum_{j \in image2} Dist_{colorPatch_i \to colorPatch_j}$$

The processing circuitry 104 may provide information indicative of similarities of the images being compared responsive to similarities of the regions of the images as indicated by the calculated distances corresponding to the respective regions. For example, the stored images may be ranked from closest, or most similar, to farthest, or most dissimilar. The processing circuitry 104 may depict the search results using display 116 and the user may select desired images for viewing, as indicated at step 408. Initial image data of selected images may be retrieved from the storage circuitry 106 and displayed using the display 116.

To facilitate processing of the search representation with respect to the information regarding the stored images, the processing circuitry 104 may initially compare the largest graphical representation of the search representation with respect to the largest graphical representation of the stored images, and subsequently proceed to analyze the smaller size graphical representations if the larger graphical representations are found to be sufficiently similar.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for image management comprising steps performed by a processor, said method comprising:
   in the processor,
      accessing image data for an image containing objects;
      generating graphical representations of the objects based upon centroids of the objects;
      determining the centroids and the sizes of the graphical representations;
      determining the locations of the centroids of the graphical representations;
      determining morphologies of the graphical representations based upon the determined locations of the centroids, wherein the morphologies of the graphical representations comprise physical relationships of the graphical representations with respect to each other; and assigning human readable lexical representations of the locations of the centroids, the sizes, the colors and morphologies of the graphical representations.

2. The method according to claim 1, further comprising:

for images containing a plurality of graphical representations, determining a morphology of the plurality of graphical representations with respect to each other; and assigning lexical representations of the relative positions of the plurality of graphical representations.

3. The method according to claim 2, wherein assigning lexical representations of the plurality of graphical representations further comprises assigning lexical representations pertaining to which of the graphical representations are in contact with which of the graphical representations and which of the graphical representations are in contact with at least one border of a respective image.

4. The method according to claim 3, wherein generating the graphical representations of the objects further comprises quantizing the image to identify graphical representations having at least one of a consistent and a common characteristic to identify the plurality of graphical representations.

5. The method according to claim 1, further comprising storing the assigned human readable lexical representations in a database stored on a computer readable storage medium, said database being searchable through human readable lexicon in a metadata of the image data.

6. The method according to claim 1, wherein assigning human readable lexical representations of the sizes of the graphical representations further comprises assigning a quantized set of lexical size designations to the regions.

7. The method according to claim 1, further comprising: charting the locations of the centroids on a morpho-lexical histogram, dividing the morpho-lexical histogram into a plurality of virtual regions, wherein determining the morphologies of the graphical representations further comprises determining which of the graphical representations are contained within which of the plurality of virtual regions, and wherein assigning human readable lexical representations of the morphologies of the graphical representations further comprises assigning human readable lexical representations of the morphologies based upon the relationships between the virtual regions and the graphical representations contained within the virtual regions.

8. The method according to claim 7, wherein assigning human readable lexical representations of the morphologies further comprises assigning human readable position designations for each of the virtual regions to distinguish the locations of the virtual regions with respect to each other and to thereby identify the locations of the graphical representations with respect to each other.

9. The method according to claim 5, further comprising: retrieving at least one image from the database in response to receipt of a search query, wherein the search query comprises a text-based query.

10. The method according to claim 9, further comprising: determining one or more characteristics of the search query, wherein the one or more characteristics define relative locations of various graphical representations in a desired image.

11. The method according to claim 10, further comprising: comparing the one or more characteristics with the assigned human readable lexical representations stored in the database;

determining whether one or more of the images stored in the database contains features that substantially match the one or more characteristics; and wherein retrieving at least one image from the database further comprises retrieving at least one image that contains features that substantially match the one or more characteristics.

12. The method according to claim 11, further comprising: ranking a plurality of images based on similarities between the one or more characteristics and the assigned human readable lexical representations of the images in response to a determination that a plurality of images contains features that substantially match the one or more characteristics.

13. The method according to claim 5, further comprising: retrieving at least one image from the database in response to receipt of a search query, wherein the search query comprises a scanned image;

morpho-lexically processing the scanned image to derive lexical representations of the scanned image;

comparing the lexical representations of the scanned image with the assigned human readable lexical representations stored in the database;

determining whether one or more of the images stored in the database contains features that substantially match the lexical representations of the scanned image; and wherein retrieving at least one image from the database further comprises retrieving at least one image that contains features that substantially match the lexical representations of the scanned image.

14. An image management system comprising:

processing circuitry configured to access image data of a plurality of images, said processing circuitry being configured to generate graphical representations of objects contained in the plurality of images based upon centroids of the objects, to determine the centroids and the sizes of the graphical representations, to determine morphologies of the graphical representations, and to assign human readable lexical representations of the locations of the centroids, the sizes, the colors and the morphologies of the graphical representations; and storage circuitry configured to store the plurality of images and to store the plurality of human readable lexical representations of the plurality of images.

15. The image management system according to claim 14, wherein the processing circuitry is further configured to quantize the images to identify graphical representations in the respective images having at least one of a consistent and a common characteristic to thereby identify the plurality of graphical representations.

16. The image management system according to claim 14, wherein the processing circuitry is further configured to chart the locations of the centroids on a morpho-lexical histogram, to divide the morpho-lexical histogram into a plurality of virtual regions, and to assign human readable representations of the morphologies of the graphical representations based upon the relationships between the virtual regions and the graphical representations contained within the virtual regions.

17. The image management system according to claim 14, wherein the processing circuitry is configured to retrieve at least one image from the storage circuitry in response to receipt of a search query, and wherein the processing circuitry is further configured to determine one or more characteristics of the search query, wherein the one or more characteristics define at least the relative locations of various graphical representations in a desired image.

18. The image management system according to claim 17, wherein the search query comprises a text-based query, and wherein the processing circuitry is further configured to analyze the text-based query to determine features relevant to the text-based query and to search for images in the storage circuitry that are similar to the determined features by comparing the determined features with the assigned human readable lexical representations of the images.

19. The image management system according to claim 17, wherein the search query comprises a scanned image, and wherein the processing circuitry is further configured to morpho-lexically process the scanned image to thereby derive lexical representations of the scanned image, and wherein the processing circuitry is still further configured to search for images in the storage circuitry that are similar to the lexical representations by comparing the lexical representations of the scanned image with the assigned human readable lexical representations.

20. A tangible computer readable storage medium on which is embedded one or more computer programs, said one or more computer programs implementing a method for image management, said one or more computer programs comprising a set of instructions for:

accessing image data for a plurality of images containing objects;

generating graphical representations of the objects based upon centroids of the objects;

determining the centroids and the sizes of the graphical representations;

determining the locations of the centroids of the graphical representations for each of the plurality of images;

determining morphologies of the graphical representations based upon the determined locations of the centroids, wherein the morphologies of the graphical representations comprise physical relationships of the graphical representations with respect to each other;

assigning human readable lexical representations of the locations of the centroids, the sizes, the colors and morphologies of the graphical representations for each of the plurality of images; and storing the assigned human readable lexical representations in a database, said database being searchable through search queries containing human readable lexicon.

* * * * *